(12) United States Patent
Uchida

(10) Patent No.: US 8,508,931 B2
(45) Date of Patent: Aug. 13, 2013

(54) RECORDER SET AND HOLDER

(75) Inventor: Shinya Uchida, Higashiosaka (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 221 days.

(21) Appl. No.: 12/974,061

(22) Filed: Dec. 21, 2010

(65) Prior Publication Data

US 2011/0157796 A1    Jun. 30, 2011

(30) Foreign Application Priority Data

Dec. 29, 2009   (JP) ................................. 2009-299087

(51) Int. Cl.
| | |
|---|---|
| G06F 1/16 | (2006.01) |
| G06F 13/00 | (2006.01) |
| H01R 39/00 | (2006.01) |
| H01R 41/00 | (2006.01) |

(52) U.S. Cl.
   USPC ............ 361/679.41; 361/679.43; 361/679.44; 710/303; 710/304; 439/29; 439/32

(58) Field of Classification Search
   USPC ............. 361/679.01–679.45, 679.55–679.59; 710/303, 304; 345/156, 157, 168, 169; 439/29–32, 131
   See application file for complete search history.

(56) References Cited

U.S. PATENT DOCUMENTS

| | | | | |
|---|---|---|---|---|
| 5,070,609 | A * | 12/1991 | Teramachi ................ | 29/898.049 |
| 5,452,180 | A * | 9/1995 | Register et al. .......... | 361/679.44 |
| 7,014,486 | B1 * | 3/2006 | Wu et al. ...................... | 439/248 |
| 7,292,881 | B2 * | 11/2007 | Seil et al. ................... | 455/575.1 |
| 8,083,195 | B2 * | 12/2011 | Osada ........................ | 248/274.1 |
| 8,086,278 | B2 * | 12/2011 | Li et al. ...................... | 455/569.1 |
| 8,274,786 | B2 * | 9/2012 | Sapper et al. ............... | 361/679.4 |
| 2004/0190234 | A1 * | 9/2004 | Lin et al. ........................ | 361/681 |
| 2007/0155203 | A1 * | 7/2007 | Shabtai et al. ................. | 439/131 |
| 2010/0331652 | A1 * | 12/2010 | Groll et al. ..................... | 600/365 |

FOREIGN PATENT DOCUMENTS

| | | |
|---|---|---|
| JP | 9-102335 A | 4/1997 |
| JP | 2000-47599 A | 2/2000 |
| JP | 2001-265465 A | 9/2001 |
| JP | 2002-6986 A | 1/2002 |
| JP | 2003-298249 A | 10/2003 |
| JP | 2004-29559 A | 1/2004 |
| JP | 2005-86500 A | 3/2005 |

OTHER PUBLICATIONS

"Honjitsu no Ippin," http://k-tai.impress.co.jp/cda/article/todays_goods/34256.html With Partial Translation.
Japanese Office Action dated May 28, 2013, issued in corresponding Japanese Patent Application No. 2009-299087.

* cited by examiner

*Primary Examiner* — Jayprakash N Gandhi
*Assistant Examiner* — Nidhi Desai
(74) *Attorney, Agent, or Firm* — Westerman, Hattori, Daniels & Adrian, LLP

(57) ABSTRACT

A recorder set includes: a recorder which has a connection terminal electrically connected to external equipment, and a casing; and a holder which maintains an attitude of the recorder. The casing has an accommodation unit which accommodates the connection terminal therein, and an opening which allows the connection terminal to externally project therethrough. The holder includes an attachment unit which allows the recorder to be attached thereto in a predetermined attitude. The attachment unit includes a fit member which has an inner wall fitting the connection terminal in geometry. The fit member has an outer wall fittable in the opening.

9 Claims, 8 Drawing Sheets

RECORDER SET AND HOLDER

This nonprovisional application is based on Japanese Patent Application No. 2009-299087 filed on Dec. 29, 2009, with the Japan Patent Office, the entire contents of which are hereby incorporated by reference.

BACKGROUND OF THE INVENTION

1. Field of the Invention

The present invention relates to a recorder set and a holder.

2. Description of the Related Art

In recent years, a recorder has been developed that has a slidable Universal Serial Bus (USB) terminal that can be accommodated in the main body and thus allows the recorder to be connected directly to a personal computer (PC) without a cable.

A holder which maintains the recorder's attitude and secures the recorder to a member to which the holder is to be secured for example has a rubber clip and a tripod attachment unit, and the holder has its main body attached via the tripod attachment unit to a tripod and the clip is used to pinch the recorder's main body to attach the recorder to the tripod.

SUMMARY OF THE INVENTION

The present invention provides a recorder set including: a recorder which has a connection terminal electrically connected to external equipment, and a casing; and a holder which maintains an attitude of the recorder. The casing has an accommodation unit which accommodates the connection terminal therein, and an opening which allows the connection terminal to externally project therethrough. The holder includes an attachment unit which allows the recorder to be attached thereto in a predetermined attitude. The attachment unit includes a fit member which has an inner wall fitting the connection terminal in geometry. The fit member has an outer wall fittable in the opening.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter reference will be made to the drawings to describe a recorder set and a holder in one embodiment of the present invention. While in the present embodiment the recorder will be described as an audio recorder having a connection terminal in the form of a slidable USB terminal, the recorder is not limited thereto. The recorder may for example be a video recorder. The connection terminal may for example be a terminal accommodating small computer system interface (SCSI).

Figure 1:
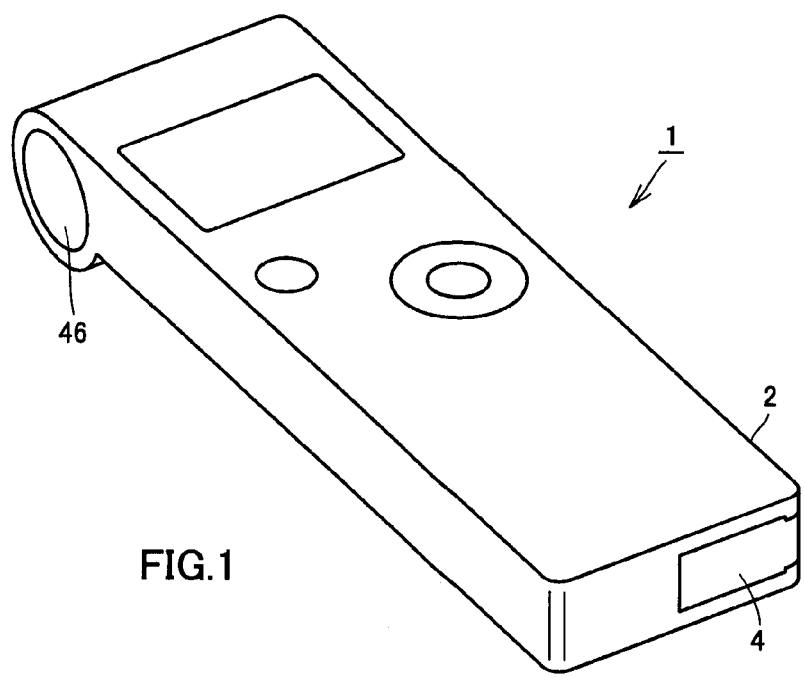
FIG. 1 shows an appearance of an audio recorder according to one embodiment of the present invention in a perspective view.

FIG. 1 shows in a perspective view an appearance of an audio recorder included in an audio recorder set according to one embodiment of the present invention. As shown in FIG. 1, the present embodiment provides the audio recorder set including an audio recorder 1, which is an IC recorder or a similar audio recorder and includes a microphone 46. Microphone 46 is provided at the opposite side surfaces of an end of audio recorder 1.

Microphone 46 inputs an audio signal which is in turn recorded in the form of a digital audio signal to a memory incorporated in the IC recorder. Microphone 46 has directivity for sensitivity input, and accordingly, it is desirable that microphone 46 is placed and secured at a position which is high in sensitivity for audio source. The present recorder set and holder can maintain the IC recorder's attitude, and hence allows microphone 46 to be arranged and fixed at a desired position. The present invention is applicable not only to the IC recorder but also a digital camera, for example.

Furthermore, audio recorder 1 has a casing 2 in the form of a generally rectangular parallelepiped and a slidable USB terminal. Casing 2 has a display panel, a variety of operation buttons and the like incorporated therein. Casing 2 has a side end having a lid 4 covering an opening allowing the USB terminal to project therethrough.

Figure 2:
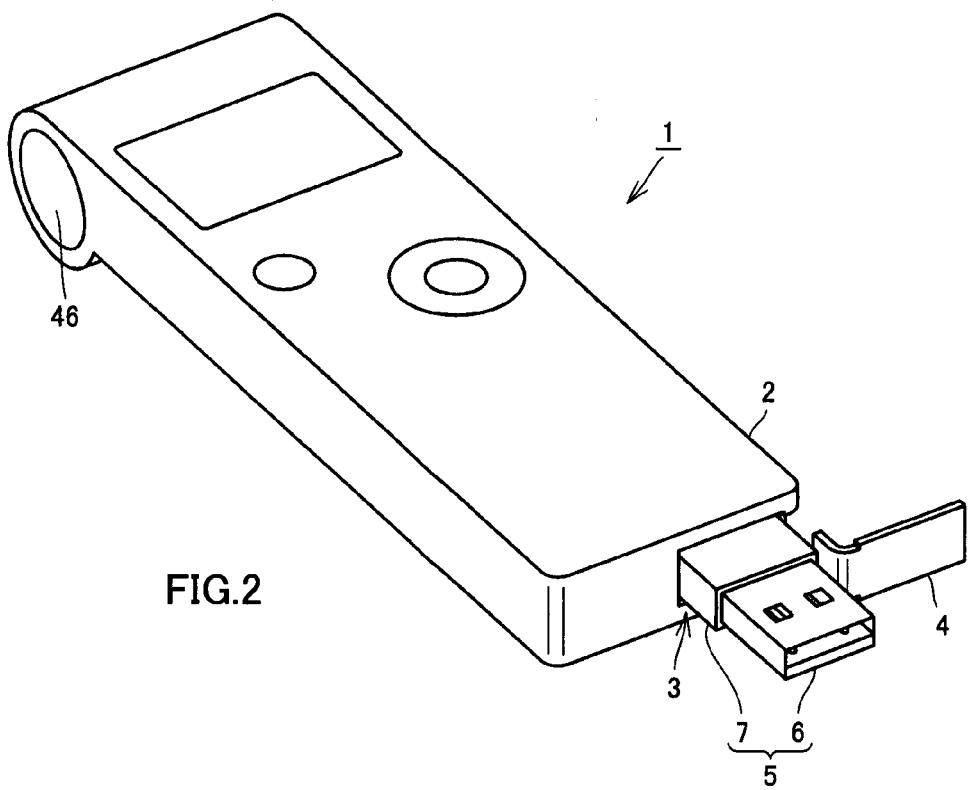
FIG. 2 shows in a perspective view the audio recorder according to the embodiment with a USB terminal slid out and thus externally projected.

FIG. 2 shows in a perspective view the audio recorder according to the embodiment with the USB terminal slid out and thus externally projected. As shown in FIG. 2, lid 4 is coupled with casing 2 by a joint (not shown) pivotably. More specifically, lid 4 is slid in the longitudinal direction of casing 2 outwardly of casing 2, and then pivoted to an opposite side, as shown in FIG. 2.

USB terminal 5 has a plug 6 for electrical connection to external equipment, and a resin protector 7 provided at a root of plug 6. The external equipment is for example a PC including a USB interface or the like. Plug 6 is a rectangular parallel piped. Protector 7 is a rectangular parallel piped larger in geometry than plug 6. An opening 3 is rectangular, and when USB terminal 5 is slid out and externally projected, opening 3 has protector 7 fitted therein.

Figure 3:
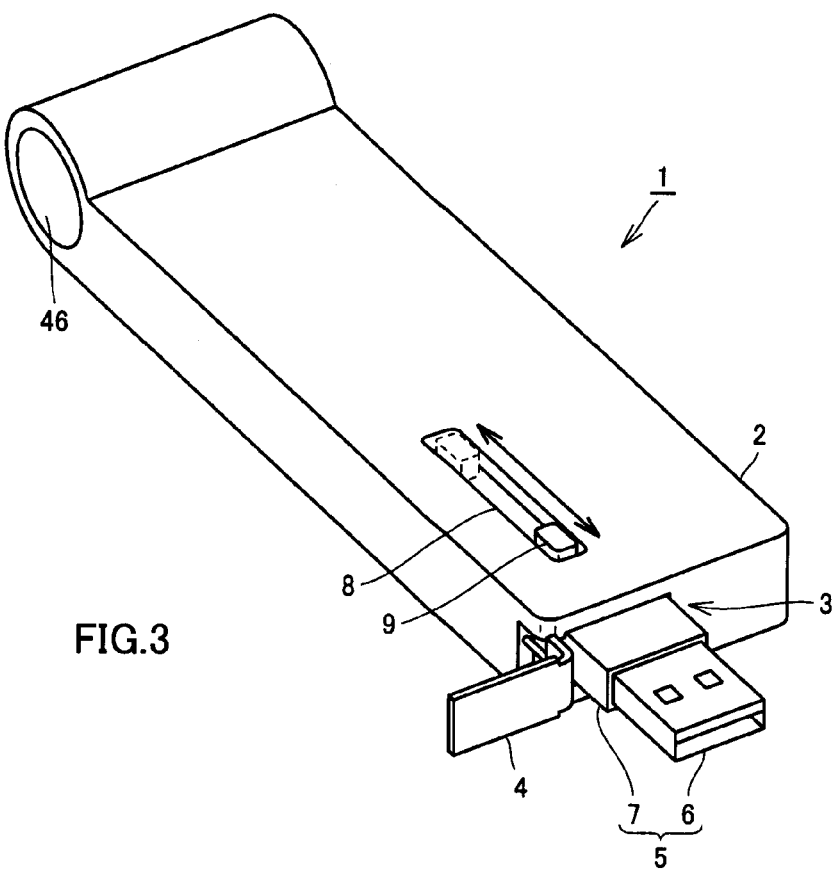
FIG. 3 shows in a perspective view the audio recorder according to the embodiment with the USB terminal slid out and thus externally projected, as seen at the audio recorder's back side.

FIG. 3 shows in a perspective view the audio recorder according to the embodiment with the USB terminal slid out and thus externally projected, as seen at the audio recorder's back side. As shown in FIG. 3, casing 2 has a back surface having an elongate hole 8 extending in the longitudinal direction of casing 2. In hole 8 is provided a slidable tab 9 projecting from protector 7. Slidable tab 9 is slidable along hole 8 in a direction indicated by an arrow indicated in the figure.

Slidable tab 9 can be slid toward an end of casing 2 to externally project USB terminal 5 outside casing 2. Slidable tab 9 can also be slid toward the center of casing 2 to accommodate USB terminal 5 in casing 2.

Figure 4:
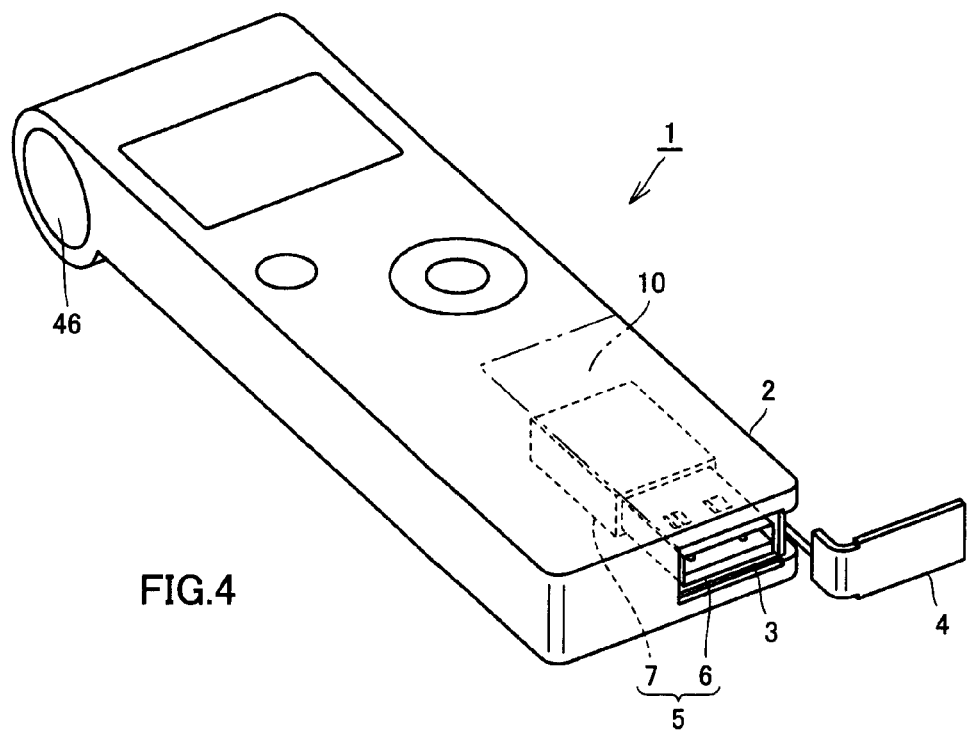
FIG. 4 shows in a perspective view the audio recorder according to the embodiment with the USB terminal accommodated in a casing.

FIG. 4 shows in a perspective view the audio recorder according to the embodiment with the USB terminal accommodated in the casing. Casing 2 is internally provided with an accommodation unit 10 to accommodate USB terminal 5 therein. When accommodation unit 10 has USB terminal 5 accommodated therein, there is a spacing between opening 3 and plug 6.

Figure 5:
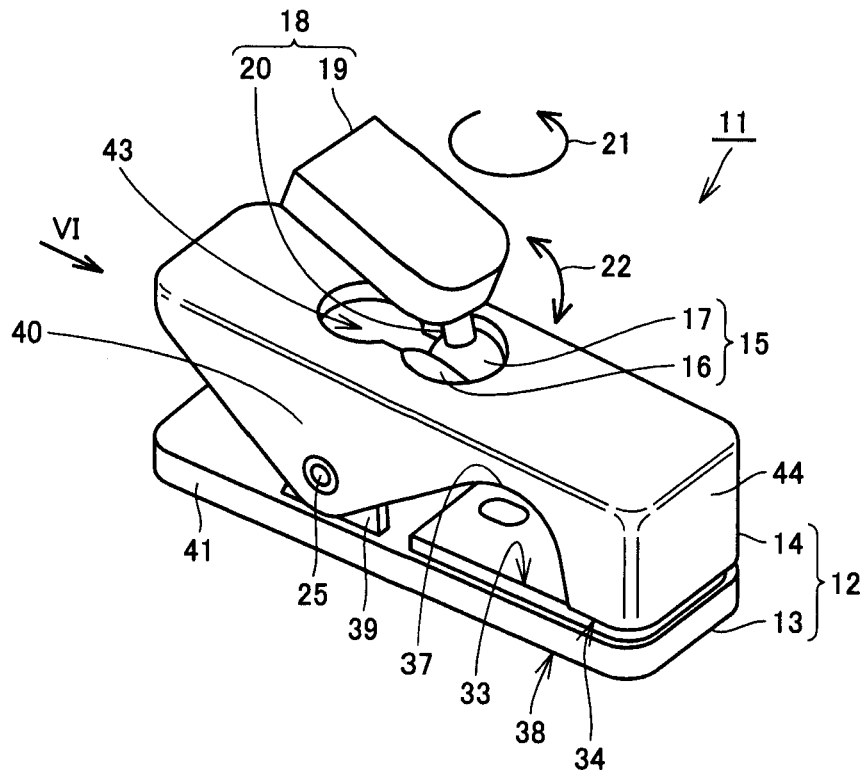
FIG. 5 is a perspective view of how a holder according to the embodiment is configured.
Figure 6:
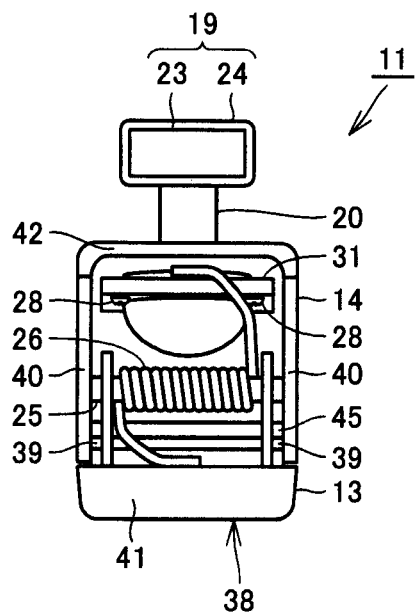
FIG. 6 shows the FIG. 5 holder in a direction VI.

FIG. 5 is a perspective view of how a holder according to the embodiment is configured. FIG. 6 shows the FIG. 5 holder in a direction VI. As shown in FIG. 5, the present embodiment provides an audio recorder set including a holder 11 including a securing unit 12 via which audio recorder 1 is secured to a member to which the holder is secured, an attachment unit 18 to which audio recorder 1 is attached, and a coupling unit 15 coupling securing unit 12 and attachment unit 18 together.

As shown in FIGS. 5 and 6, securing unit 12 has a clip structure and includes a first securing member 13, a second securing member 14, a shaft 25 axially supporting first securing member 13 and second securing member 14, and a spring 26 wound on shaft 25.

First securing member 13 has a first base 41 generally in the form of a rectangular parallelepiped. First base 41 has a bottom surface having a generally flat placement surface 38. First base 41 as seen lengthwise has one end having an upper surface provided with a generally flat, first pinching surface 33. First base 41 has a pair of shaft receivers 39 close to opposite ends as seen widthwise, and extending upward from a top surface of first base 41.

Second securing member 14 is opposite to first securing member 13. Second securing member 14 has a second base 42 generally in the form of a rectangular parallelepiped. Second base 42 has a hole 43 in a vicinity of its center to allow a round member 17, which will be described later, to pass therethrough. Provided adjacent to hole 43 is an engagement portion 16, which will be described later. Second base 42 as seen widthwise has opposite ends provided with a pair of sides 40 extending downward from a bottom surface of second base 42.

Second securing member 14 has a side 44 extending downward from a bottom surface of one end of second base 42 as seen lengthwise, and a bottom 45 immediately adjacent to a lower end of side 44 and opposite to second base 42. Bottom 45 has a lower plane opposite to first pinching surface 33 and provided with a generally flat, second pinching surface 34.

First securing member 13 and second securing member 14 have shaft receivers 39 and sides 40, respectively, opposite to each other. The pair of shaft receivers 39 and the pair of sides 40 are each provided with a shaft hole for receiving shaft 25 therethrough. The shaft hole is provided in a direction orthogonal to the longitudinal direction of first securing member 13 and second securing member 14. The pair of sides 40 are each provided with a semi-circular recess 37 between the shaft hole and side 44.

By inserting shaft 25 through the shaft holes of the pair of shaft receivers 39 and the pair of sides 40, first securing member 13 and second securing member 14 are axially supported to swing about shaft 25, as desired. Spring 26 is biased in a direction to pull an upper surface of an end of first securing member 13 opposite to first pinching surface 33 as seen lengthwise and a lower surface of an end of second securing member 14 opposite to second pinching surface 34 as seen lengthwise away from each other. As a result, first securing member 13 and second securing member 14 are biased by spring 26 to cause first pinching surface 33 and second pinching surface 34 to press each other.

Above securing unit 12 is provided attachment unit 18 to which audio recorder 1 is attached. Attachment unit 18 includes a fit member 19 having an inner wall 23 allowing USB terminal 5 to have plug 6 geometrically fitted thereto. Fit member 19 has an outer wall 24 fittable in opening 3 of casing 2 of audio recorder 1.

Plug 6 is a rectangular parallelepiped, and accordingly, inner wall 23 is rectangular as seen in a direction in which plug 6 is inserted into fit member 19. Furthermore, inner wall 23 is formed to have a depth to allow plug 6 to be completely accommodated in fit member 19. Outer wall 24 is a rectangular parallelepiped generally identical in geometry to protector 7 of USB terminal 5. Outer wall 24 is formed to have a length at least equivalent to the depth of inner wall 23.

Fit member 19 is provided with a pivot 20 extending downward from a bottom surface of fit member 19 at a position at which USB terminal 5 is not fitted. Pivot 20 is columnar Fit member 19 and pivot 20 configure attachment unit 18. Round member 17 is provided at an end of pivot 20.

Second securing member 14 is provided at second base 42 with engagement portion 16 covering a portion of an upper half of round member 17. Second base 42 has attached to a lower surface thereof immediately under engagement portion 16 an accommodation plate 31 having a semispherical recess for accommodating a bottom half of round member 17. Second base 42 and accommodation plate 31 are coupled by a screw 28. Round member 17, engagement portion 16, accommodation plate 31 and screw 28 together configure coupling unit 15. Coupling unit 15 has a ball joint structure.

Coupling unit 15 couples attachment unit 18 and securing unit 12 together to be movable relative to each other. More specifically, screw 28 is adjusted by a torque controlled to engage round member 17 so as to allow attachment unit 18 to swivel and swing as indicated in FIG. 5 by arrows 21 and 22, respectively.

When screw 28 is tightened with an excessively large torque, round member 17 would be fixed completely, and attachment unit 18 and securing unit 12 cannot move relative to each other. In contrast, when screw 28 is tightened with an excessively small torque, round member 17 would be engaged insufficiently, and holder 11 cannot appropriately maintain the attitude of audio recorder 1 attached to attachment unit 18.

Furthermore, a lubricant is applied to coupling unit 15 at a portion at which securing unit 12 and attachment unit 18 are in contact with each other. When securing unit 12 and attachment unit 18 move relative to each other, the lubricant allows round member 17 to slide with reduced noise.

Figure 7:
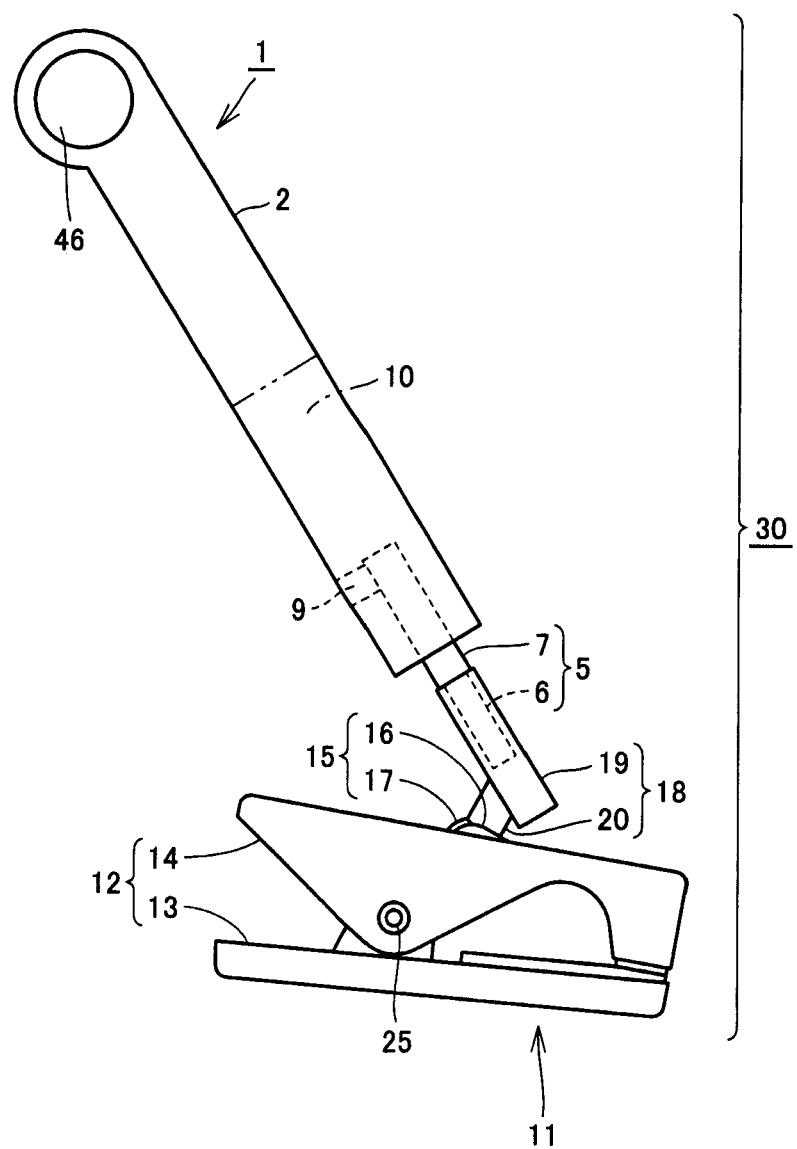
FIG. 7 shows in the embodiment the audio recorder attached to the holder with the USB terminal projected, as seen in a side view.

In the present embodiment, audio recorder set 30 allows audio recorder 1 to be attached to holder 11 in a structure, as will be described hereinafter. FIG. 7 shows in the embodiment the audio recorder attached to the holder with the USB terminal projected, as seen in a side view. As shown in FIG. 7, audio recorder 1 can be attached to holder 11 with USB terminal 5 slid out and thus projected from accommodation unit 10 of casing 2.

To attach audio recorder 1 to holder 11, plug 6 is inserted into fit member 19 and fit member 19 and protector 7 have their respective ends brought into contact with each other or adjacently. The plug 6 geometry and the fit member 19 inner wall are formed such that the former is fitted into the latter, and the coupling unit 15 round member 17 is engaged such that it is not moved by the weight of audio recorder 1. The holder can thus be secured to a member to which it is to be secured while also maintaining the attitude of audio recorder 1 in a state as shown in FIG. 7.

It should be noted, however, that in the FIG. 7 state, audio recorder 1 is secured with USB terminal 5 slid out and projected, and accordingly, when audio recorder 1 attached to holder 11 receives impact or similar external force, USB terminal 5 intensively experiences the impact or similar external force. Accordingly, in view of protecting audio recorder 1, a manner of attachment minimizing external force exerted to USB terminal 5 is desired.

Figure 8:
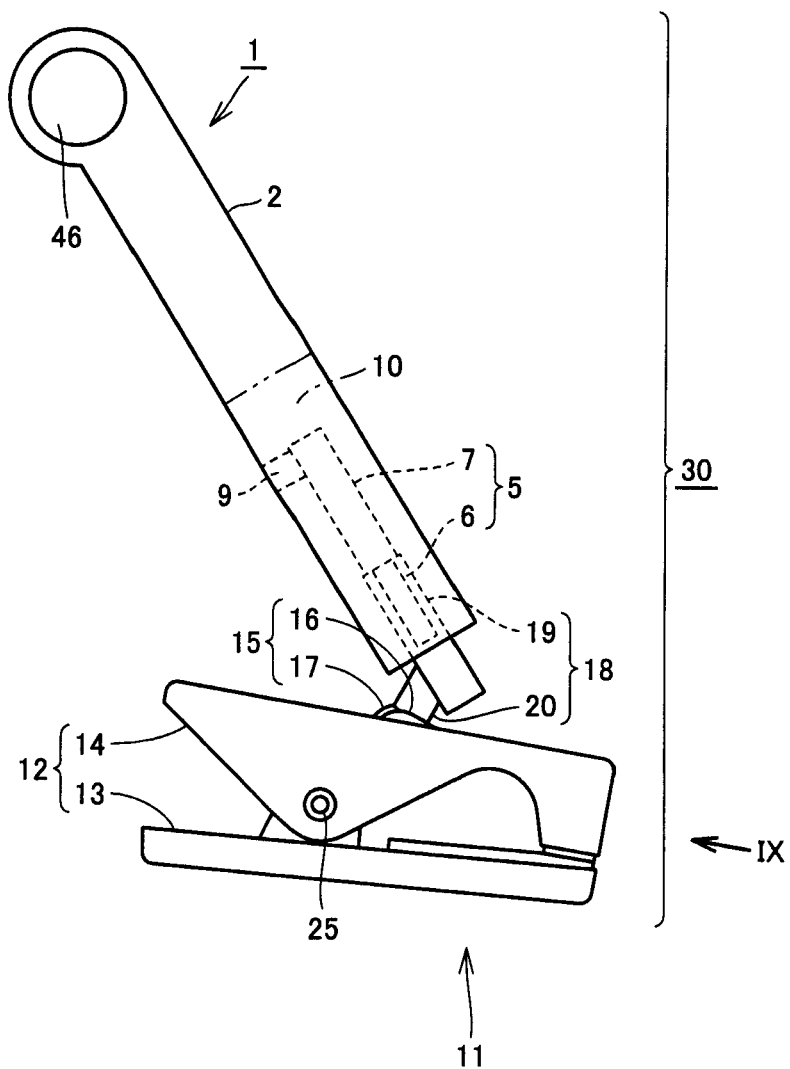
FIG. 8 shows in the embodiment the audio recorder attached to the holder with the USB terminal accommodated, as seen in a side view.

FIG. 8 shows in the embodiment the audio recorder attached to the holder with the USB terminal accommodated, as seen in a side view. In the present embodiment, audio recorder set 30 allows audio recorder 1 to be attached to holder 11, with USB terminal 5 accommodated in accommodation unit 10, as shown in FIG. 8.

To attach audio recorder 1 to holder 11, initially, as shown in FIG. 7, plug 6 is inserted into fit member 19 and fit member 19 and protector 7 have their respective ends brought into contact with each other or adjacently. Then, slidable tab 9 is operated to accommodate USB terminal 5 in accommodation unit 10. In doing so, fit member 19 is also inserted into casing 2.

Figure 9:
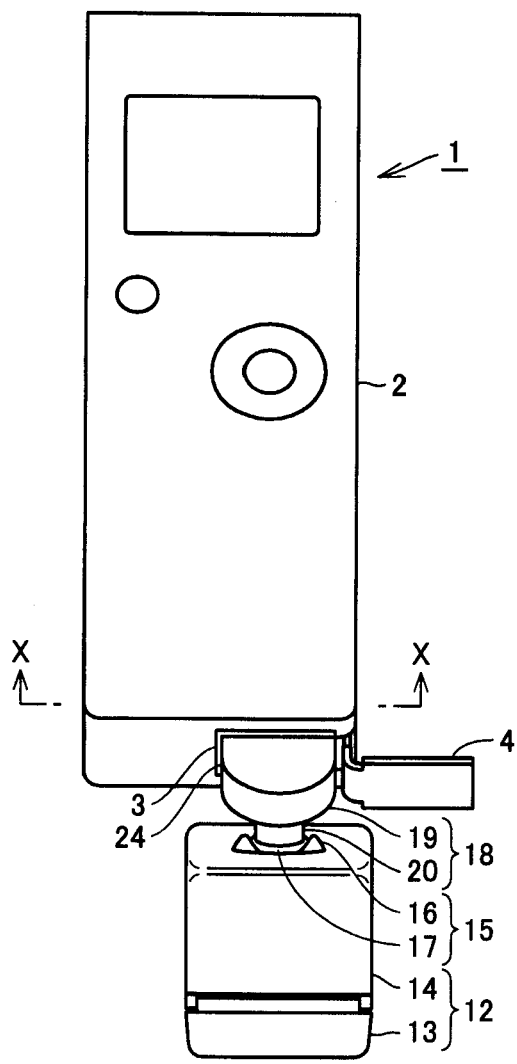
FIG. 9 shows a state, as seen in a direction IX shown in FIG. 8.
Figure 10:
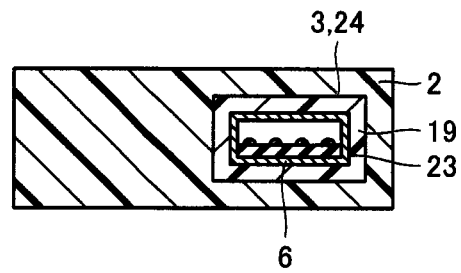
FIG. 10 is a cross section seen in a direction indicated by an arrow X-X of FIG. 9.

FIG. 9 shows a state, as seen in a direction IX shown in FIG. 8. FIG. 10 is a cross section seen in a direction indicated by an arrow X-X of FIG. 9. As shown in FIGS. 9 and 10, the fit member 19 geometry and the casing 2 opening 3 are formed such that the former is fitted into the latter.

Accordingly, when USB terminal 5 accommodated in accommodation unit 10 is attached to holder 11, plug 6, fit member 19 and opening 3 are fitted into one another and are thus as if they were a single structure. This allows audio recorder 1 to be attached to holder 11 more firmly.

When audio recorder 1 attached to holder 11 receives impact or similar external force, the impact or similar external force is dispersed to casing 2 and USB terminal 5 and thus acts thereon, which can prevent audio recorder 1 from being destroyed by external force.

Figure 11:
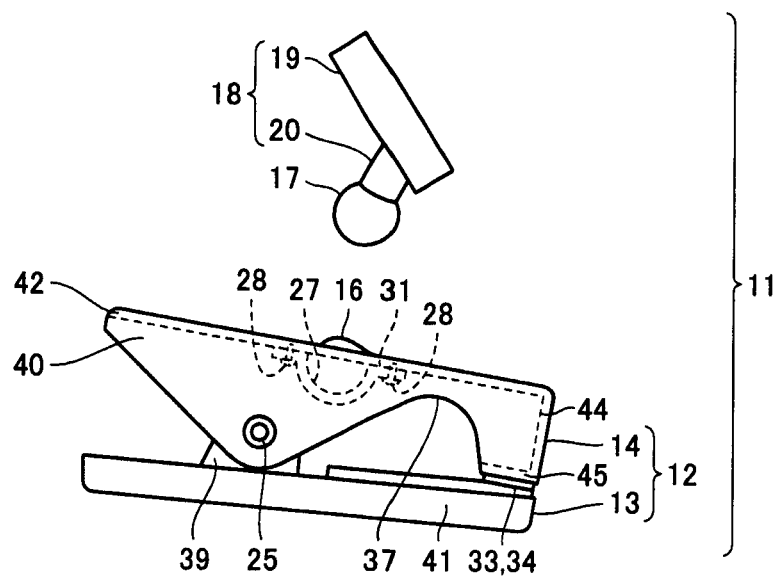
FIG. 11 shows in a side view the holder according to the embodiment with an attachment unit detached from a securing unit.

FIG. 11 shows in a side view the holder according to the embodiment with the attachment unit detached from the securing unit. As shown in FIG. 11, attachment unit 18 and securing unit 12 are coupled such that attachment unit 18 is detached from securing unit 12 when holder 11 receives an excessive load in a direction to pull attachment unit 18 away from securing unit 12. The excessive load as referred to herein means a load capable of destroying a component of holder 11.

When the excessive load acts on holder 11, attachment unit 18 can be detached from securing unit 12 to prevent holder 11 from having a component destroyed. In the present embodiment, second securing member 14 is formed of an elastically deformable resin material. Accordingly, when an excessive load acts in a direction to pull attachment unit 18 away from securing unit 12, engagement portion 16 engaging round member 17 elastically deforms to disengage round member 17. As a result, attachment unit 18 can be detached from securing unit 12 to prevent the excessive load from destroying attachment unit 18 and securing unit 12.

In the present embodiment, holder 11 has the coupling unit configured to allow attachment unit 18 that has been detached to be again coupled with securing unit 12. As has been described previously, engagement portion 16 having been disengaged recovers its original geometry. Furthermore, accommodation plate 31 accommodating the bottom half of round member 17 is secured with screw 28, i.e., detachably attached to second securing member 14.

Figure 12:
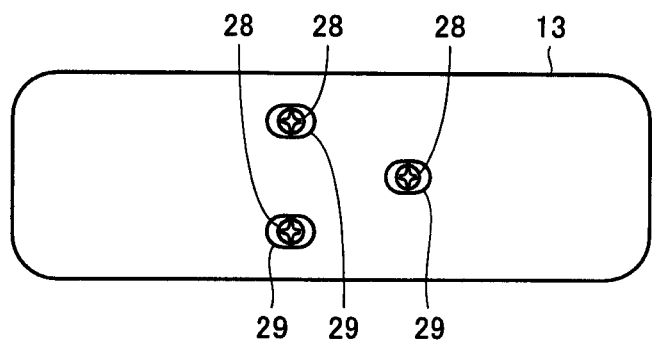
FIG. 12 shows in a bottom view the securing unit according to the embodiment, as seen at its bottom side.

FIG. 12 shows in a bottom view the securing unit according to the embodiment, as seen at its bottom side. As shown in FIG. 12, first securing member 13 has a hole 29 for fastening screw 28. While the present embodiment provides first securing member 13 with three fastening holes 29, first securing member 13 may have a different number of fastening holes 29.

Fastening hole 29 allows a driver or the like to be passed therethrough, and can thus facilitate fastening and removing screw 28. Removing screw 28 and thus removing accommodation plate 31 from second securing member 14 allow round member 17 to be again passed through hole 43 and then engaged with engagement portion 16 of second securing member 14. With round member 17 engaged with engagement portion 16, accommodation plate 31 can be attached to second securing member 14 with screw 28 to allow attachment unit 18 that has been detached to be again coupled with securing unit 12.

Figure 13A:
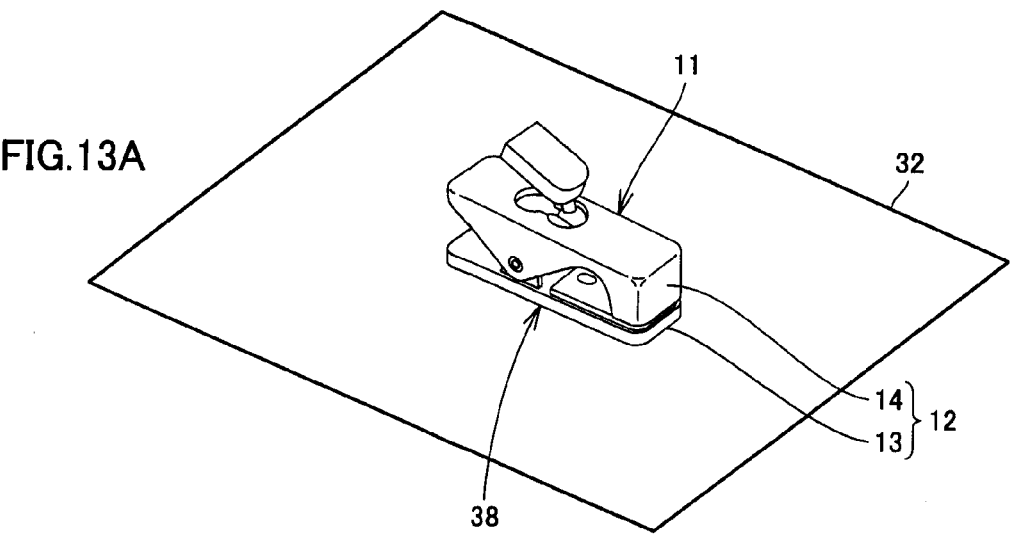
FIG. 13A is a perspective view of the holder placed on a flat surface.
Figure 13B:
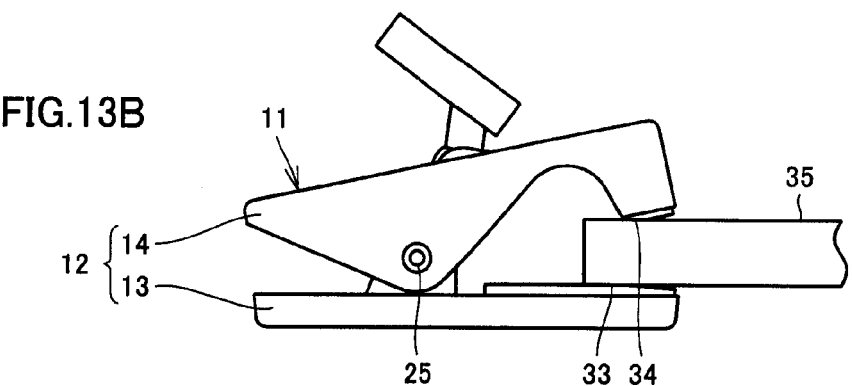
FIG. 13B is a side view of the holder with its pinching surfaces pinching a member to which the holder is secured.
Figure 13C:
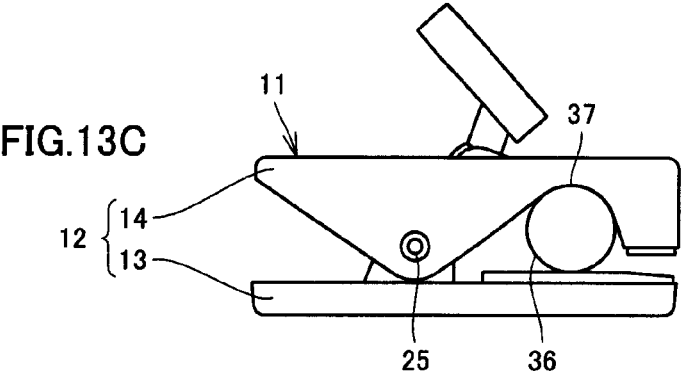
FIG. 13C is a side view of the holder with the securing unit having a recess holding a member to which the holder is secured.

In the present embodiment the holder is secured to a member to which it is to be secured, as will be described hereinafter. FIG. 13A is a perspective view of the holder placed on a flat surface. FIG. 13B is a side view of the holder with its pinching surfaces pinching a member to which the holder is secured. FIG. 13C is a side view of the holder with the securing unit having a recess holding a member to which the holder is secured.

As shown in FIG. 13A, securing unit 12 has a placement surface 38 which can be placed on a top flat surface of a member 32 to which the holder is to be attached. Accordingly, placement surface 38 can be placed in contact with the top surface of member 32 in placing holder 11 to reliably secure holder 11.

As has been described previously, securing unit 12 has a clip structure utilizing a biasing force of a spring serving as a pinching/holding means pinching a member 35 to which the holder is secured. As shown in FIG. 13B, securing unit 12 has opposite pinching surfaces 33, 34 capable of pinching member 35 therebetween. The clip structure allows pinching surfaces 33, 34 to be pressed against member 35 and thus pinch member 35 therebetween to secure holder 11 to member 35.

As shown in FIG. 13C, securing unit 12 has a recess 37 geometrically matching a columnar member 36 to which the holder is to be secured. The clip structure allows recess 37 to be pressed against member 36 to hold member 36 to secure holder 11 to member 36.

While in the present embodiment holder 11 is formed to have a structure allowing the above three securing manners, the holder may be configured to allow any one of the manners or a different manner.

Holder 11 as described above allows audio recorder 1 to be attached to attachment unit 18 having fit member 19 that plug 6 of USB terminal 5 of audio recorder 1 is fitted in and that is also fitted in opening 3 of casing 2 of audio recorder 1, and holder 11 can reduce/prevent a load exerted to the main body of audio recorder 1 in securing audio recorder 1.

Note that while in the present embodiment protector 7 is provided in the form of a rectangular parallelepiped and accordingly, opening 3 and fit member 19 are provided in the form of a rectangular parallelepiped, protector 7 and fit member 19, and opening 3 may be in any geometrical forms that allow protector 7 and fit member 19 to be fitted into opening 3.

Furthermore, while coupling unit 15 has been described as having a ball joint structure, it may have a different flexible structure. Furthermore, in the present embodiment, first securing member 13, second securing member 14, round member 17 and accommodation plate 31 are formed of polybutylene terephthalate (PBT). PBT allows round member 17 to slide with reduced noise, however, other material may be used.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A recorder set comprising: a recorder which has a connection terminal to electrically connect to an external equipment, and a casing; and a holder which maintains an attitude of said recorder, said casing having an accommodation unit which accommodates said connection terminal therein, and an opening which allows said connection terminal to externally project therethrough, said holder including an attachment unit which allows said recorder to be attached thereto in a predetermined attitude, said attachment unit including a fit member having an aperture within inner walls for fitting said connection terminal into said fit member, wherein outer walls surrounding said inner walls of the fit member are fittable in said opening; wherein said inner walls of the fit member having a geometric shape for fitting said connection terminal inside said fit member when said connection terminal slides out and thus projects from said casing.

2. A recorder set according to claim 1, wherein the connection terminal is in the form of a USB terminal.

3. A holder which maintains an attitude of a recorder having an accommodation unit which accommodates a connection terminal electrically connected to external equipment and a casing having an opening which allows said connection terminal to project therethrough, comprising: an attachment unit which allows said recorder to be attached thereto in a predetermined attitude, said attachment unit including a fit member having an aperture within inner walls for fitting said connection terminal into said fit member and outer walls surrounding said inner walls of the fit member are fittable in said opening; wherein said inner walls of the fit member haying a geometric shape for fitting said connection terminal inside said fit member when said connection terminal slides out and thus projects from said casing.

4. The holder according to claim 3, comprising:
   a securing unit via which said recorder is secured to a member to which the holder is secured; and
   a coupling unit which couples said securing unit and said attachment unit together, wherein said coupling unit couples said attachment unit and said securing unit to be movable relative to each other.

5. The holder according to claim 4, wherein said coupling unit couples said attachment unit and said securing unit together such that said attachment unit is detached from said securing unit when an excessive load is received in a direction to pull said attachment unit away from said securing unit.

6. The holder according to claim 5, wherein said coupling unit is configured to allow said attachment unit that has been detached to be again coupled with said securing unit.

7. The holder according to claim 4, wherein said coupling unit has a ball joint structure.

8. The holder according to claim 4, wherein a lubricant is applied to said coupling unit at a portion at which said securing unit and said attachment unit are in contact with each other.

9. A holder according to claim 3, wherein the connection terminal is in the form of a USB terminal.

* * * * *